United States Patent
Bk et al.

(10) Patent No.: US 10,534,566 B1
(45) Date of Patent: Jan. 14, 2020

(54) CLOUD STORAGE TIERING USING APPLICATION PROGRAMMING INTERFACE

(71) Applicant: EMC IP Holding Company LLC, Hopkinton, MA (US)

(72) Inventors: Suhas Bk, Bangalore (IN); Krishna Gudipudi, Bangalore (IN); Sudeep Mathew, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/654,148

(22) Filed: Jul. 19, 2017

(51) Int. Cl.
*G06F 3/06* (2006.01)
*G06F 16/13* (2019.01)

(52) U.S. Cl.
CPC .......... *G06F 3/0685* (2013.01); *G06F 3/0649* (2013.01); *G06F 16/13* (2019.01)

(58) Field of Classification Search
CPC ..................... G06F 3/0685; G06F 17/30091
See application file for complete search history.

(56) References Cited

U.S. PATENT DOCUMENTS

| | | | | |
|---|---|---|---|---|
| 9,032,175 B2* | 5/2015 | Gao | ........... | G06F 12/02 711/165 |
| 9,069,778 B1* | 6/2015 | Bent | ........... | G06F 16/1824 |
| 9,462,055 B1* | 10/2016 | Herrin | ........... | H04L 67/1095 |
| 9,665,291 B2* | 5/2017 | Lin | ........... | G06F 3/0613 |
| 10,042,578 B2* | 8/2018 | Karve | ........... | G06F 3/0683 |
| 2012/0330894 A1* | 12/2012 | Slik | ........... | H04L 67/1097 707/626 |
| 2016/0011979 A1* | 1/2016 | Islam | ........... | G06F 12/0871 711/102 |
| 2016/0210064 A1* | 7/2016 | Dornemann | ........... | G06F 16/27 |
| 2017/0017507 A1* | 1/2017 | Mitsuno | ........... | G06F 3/0664 |
| 2017/0093587 A1* | 3/2017 | Glisson | ........... | H04L 9/3268 |
| 2017/0124057 A1* | 5/2017 | Canton | ........... | G06F 3/04847 |
| 2018/0089224 A1* | 3/2018 | Muthuswamy | ........... | H04L 67/1097 |
| 2018/0157655 A1* | 6/2018 | Dain | ........... | G06F 17/303 |
| 2018/0198765 A1* | 7/2018 | Maybee | ........... | G06F 21/602 |

(Continued)

OTHER PUBLICATIONS

Samundiswary. S, "Object Storage Architecture in Cloud for Unstructured Data", Jan. 19, 2017, IEEE (Year: 2017).*

(Continued)

*Primary Examiner* — Ryan Bertram
(74) *Attorney, Agent, or Firm* — Ryan, Mason & Lewis, LLP (57) ABSTRACT

A storage tiering system comprises a set of storage tiers, each of the storage tiers comprising a respective set of storage drives configured to store data based on an access frequency associated with the data. The set of storage tiers comprises one or more storage tiers forming at least one storage array configured to store block-based data in association with the respective sets of storage drives of the one or more storage tiers. The set of storage tiers further comprises a storage tier utilizing a cloud infrastructure configured to store object-based data in association with the set of storage drives of the storage tier. An application programming interface is configured to convert block-based data and object-based data for moving data between the one or more storage tiers associated with the storage array and the storage tier associated with the cloud infrastructure.

20 Claims, 7 Drawing Sheets

(56) References Cited

U.S. PATENT DOCUMENTS

2018/0253359 A1* 9/2018 Zhang .................... G06F 17/00
2018/0275902 A1* 9/2018 Monday ................ G06F 3/0632
2018/0349043 A1* 12/2018 Eda ....................... G06F 3/0619
2019/0073155 A1* 3/2019 Craig .................... G06F 3/0655
2019/0220198 A1* 7/2019 Kashi Visvanathan ......................
.................................................................. G06F 3/0638

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

CLOUD STORAGE TIERING USING APPLICATION PROGRAMMING INTERFACE

FIELD

The field relates generally to information processing systems, and more particularly to storage in information processing systems.

BACKGROUND

Data within an information processing system has a lifecycle. As data progresses through its lifecycle, it experiences varying levels of activity. When data gets created, it is typically heavily used. As data ages, it is accessed less often and becomes so-called "cold data."

Storage systems that are part of information processing systems are often configured to include multiple storage tiers, with different ones of the tiers providing different levels of input-output (IO) performance or other characteristics. In such systems, data may be moved from one tier to another within a given storage system based on access frequency of the data or other factors. However, conventional storage tiering arrangements are typically hampered by processing overhead costs when required to store infrequently accessed data.

SUMMARY

Illustrative embodiments provide storage systems with cloud storage tiering using an application programming interface.

For example, in one embodiment, a storage tiering system comprises a set of storage tiers, each of the storage tiers comprising a respective set of storage drives configured to store data based on an access frequency associated with the data. The set of storage tiers comprises one or more storage tiers forming at least one storage array configured to store block-based data in association with the respective sets of storage drives of the one or more storage tiers. The set of storage tiers further comprises a storage tier utilizing a cloud infrastructure configured to store object-based data in association with the set of storage drives of the storage tier. An application programming interface is configured to convert block-based data and object-based data for moving data between the one or more storage tiers associated with the storage array and the storage tier associated with the cloud infrastructure.

In further illustrative embodiments, the application programming interface may be further configured to provide at least one of write calls and read calls to one or more plugin modules associated with the cloud infrastructure. The storage tiering system may further comprise tiering software configured to utilize the application programming interface to at least one of archive and retrieve data stored on the cloud infrastructure. The data stored in the storage tier of the cloud infrastructure may comprise the least frequently accessed data in the storage tiering system. The set of storage drives of the storage tier associated with the cloud infrastructure may comprise a set of virtual cloud drives. The cloud infrastructure comprises one or more clouds which may comprise one or more of a private cloud, a public cloud, and a hybrid cloud.

These and other illustrative embodiments include, without limitation, apparatus, systems, methods and processor-readable storage media.

DETAILED DESCRIPTION

Embodiments of the present invention will be described herein with reference to exemplary information processing systems, computing systems, data storage systems, storage tiering systems, and associated servers, computers, storage units and devices and other processing devices. It is to be appreciated, however, that embodiments of the invention are not restricted to use with the particular illustrative system and device configurations shown. Moreover, the phrases "information processing system," "computing system," "data storage system" and "storage tiering system" as used herein are intended to be broadly construed, so as to encompass, for example, cloud computing or storage systems, as well as other types of systems comprising distributed virtual and/or physical infrastructure. However, a given embodiment may more generally comprise any arrangement of one or more processing devices.

An information processing system may therefore include, for example, a cloud infrastructure hosting multiple tenants that share cloud resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds).

Information processing systems with multiple storage tiers can implement such storage tiering as a manual or an automated process. Manual storage tiering is a traditional method where the storage administrator monitors the storage workloads periodically and moves the data between the tiers. Manual storage tiering is complex and time-consuming. Automated storage tiering automates the storage tiering process such that data movement between the tiers is performed in a non-disruptive manner. In automated storage tiering, the application workload is proactively monitored, and active (more frequently accessed) data is automatically moved to a higher performance tier and the inactive (less frequently accessed) data to a higher capacity, lower performance tier. One example of automated storage tiering is the Fully Automated Storage Tiering (FAST™) technology, commercially available from Dell EMC of Hopkinton, Mass. Data movements between various tiers can happen within (intra-array) or between (inter-array) storage arrays.

Many information processing systems employ storage virtualization. Virtualization in the context of storage systems is where the physical storage resources (disks) are aggregated into storage pools from which logical storage resources (referred to as, for example, logical storage units, LUNs, virtual storage volumes, logical disks, etc.) are created. In a storage virtualization, for example, each LUN is assigned the capacity required by a requesting host device.

Storage tiering for virtual storage pools (heterogeneous storage pool consisting of different types of disks) is a solution for dynamically matching storage requirements with changes in the frequency of data access. Tiering software segregates disk drives into three different categories, called storage tiers.

Figure 1:
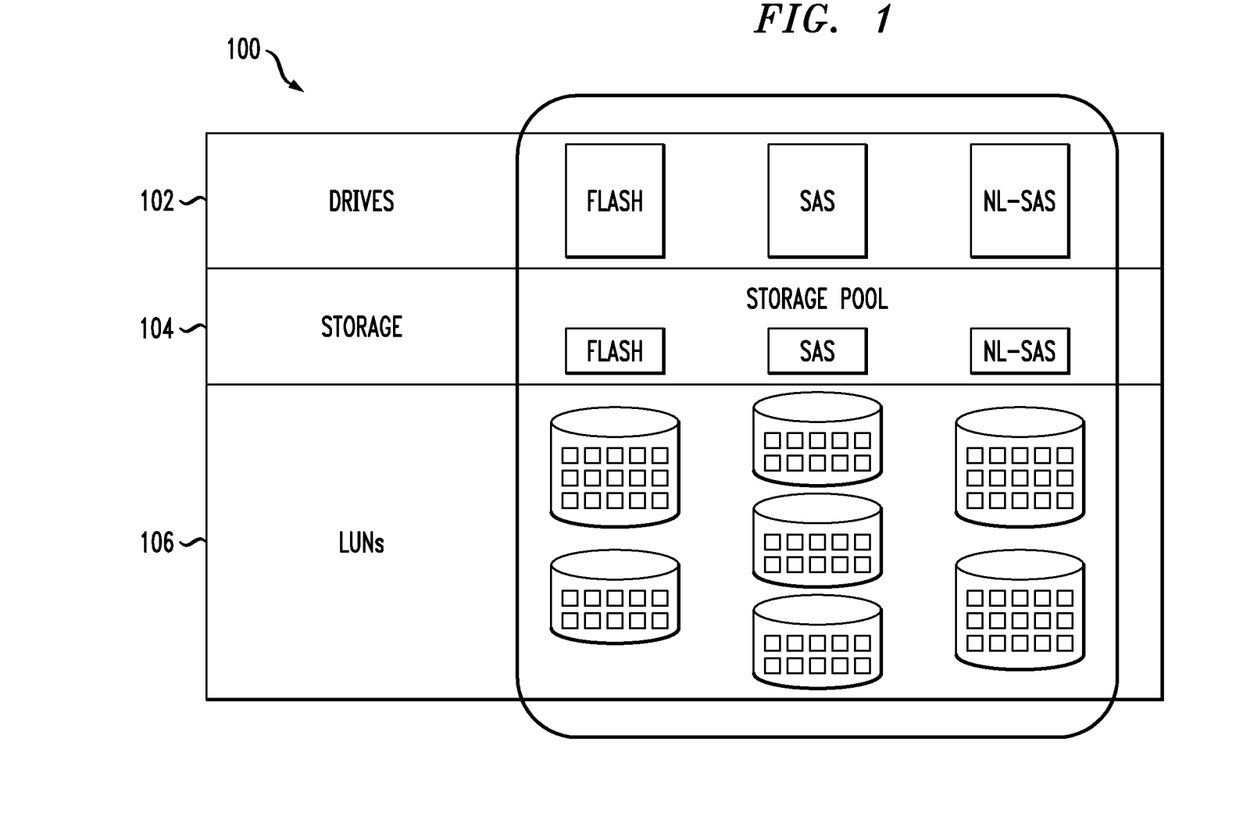
FIG. 1 is a diagram illustrating a conventional heterogenous storage pool.

In the example storage tiering environment 100 illustrated in FIG. 1, a set of drives 102 are configured to be part of a storage pool 104 in order to be available for instantiating a set of LUNs 106 as needed in a virtual storage environment. By way of example, a first storage tier that provides high performance storage functionality may comprise Flash drives, a second storage tier that provides a storage performance functionality less than the high performance functionality of the first tier may comprise Serial Attach SCSI (SAS) drives, and a third storage tier that provides capacity storage functionality may comprise Near-Line SAS (NL-SAS) drives. Other drive types can be used, and a given tier may have a mix of drive types depending on the storage performance and capacity requirements of the information processing system. SCSI refers to the Small Computer System Interface which is a set of interface standards developed by the American National Standards Institute (ANSI) for attaching peripheral devices including, but not limited to, disk drives, to computers.

More particularly, tiering software manages the placement of data blocks on tiers (collections of place holders from similarly-performing underlying storage) in storage pools. Storage arrays support storage pools, which are a collection of storage resources (drives, storage, and buses) used to create pool LUNs. Three different tiers, as mentioned above in the context of FIG. 1, are typically supported by current tiering software.

In one improvement approach, backing up the data to cloud could be done using a suitable application or appliances. However, as the data ages and becomes "frigid" (even less frequently accessed as compared to cold data), storing the data on the appliances becomes a processing overhead liability. It is to be appreciated that levels of access frequency such as hot, cold, frigid, and the like, are relative to each other and dependent on particular applications executing on the information processing system. Thus, use of such terms and levels herein are not intended to limit embodiments to specific access frequency values (e.g., seconds, minutes, days, etc.).

In accordance with illustrative embodiments, the above-mentioned and other drawbacks associated with conventional storage tiering approaches can be overcome by archiving/moving data to cloud infrastructure through tiering the coldest data (frigid or least frequently accessed data) to the cloud infrastructure. More particularly, as will be further explained in detail, illustrative embodiments provide a native mapping application programming interface (API) such that the coldest data can be tiered to the provided/mapped cloud storage. Again, note that what access frequency ranges constitute hottest, hot, cold, frigid, and coldest data is application dependent.

As mentioned above, a storage array in a conventional storage system typically includes three drive types, i.e., Flash (for an extreme performance tier with high IO performance but low storage capacity), SAS (for a performance tier with moderate IO performance and moderate storage capacity), and NL-SAS (for a capacity tier for low IO performance but high storage capacity). A group of such drives are used to construct a heterogeneous storage pool with different tiers. However, in accordance with illustrative embodiments, storage from public/private cloud providers is used to provide a new, virtual drive type called a "cloud drive." This virtual drive forms a new tier called "cloud tier" in the storage pool facilitating the data to be moved onto the cloud storage. A given cloud drive is a virtual drive that is composed of the private/public cloud storage capacity that is assigned to the given cloud drive. In one illustrative embodiment, a given cloud drive stores one or more reference pointers or resource locators to point to the private/public cloud storage capacity assigned to the given cloud drive. These cloud drives may thus be augmented by cloud storage from different public cloud infrastructure and services such as, but not limited to, Amazon Simple Storage Service (S3), Google Cloud Platform (GCP) Storage, and Microsoft Azure Blob Storage. The cloud tier would provide even higher storage capacity than the capacity tier so as to archive the coldest data.

Figure 2:
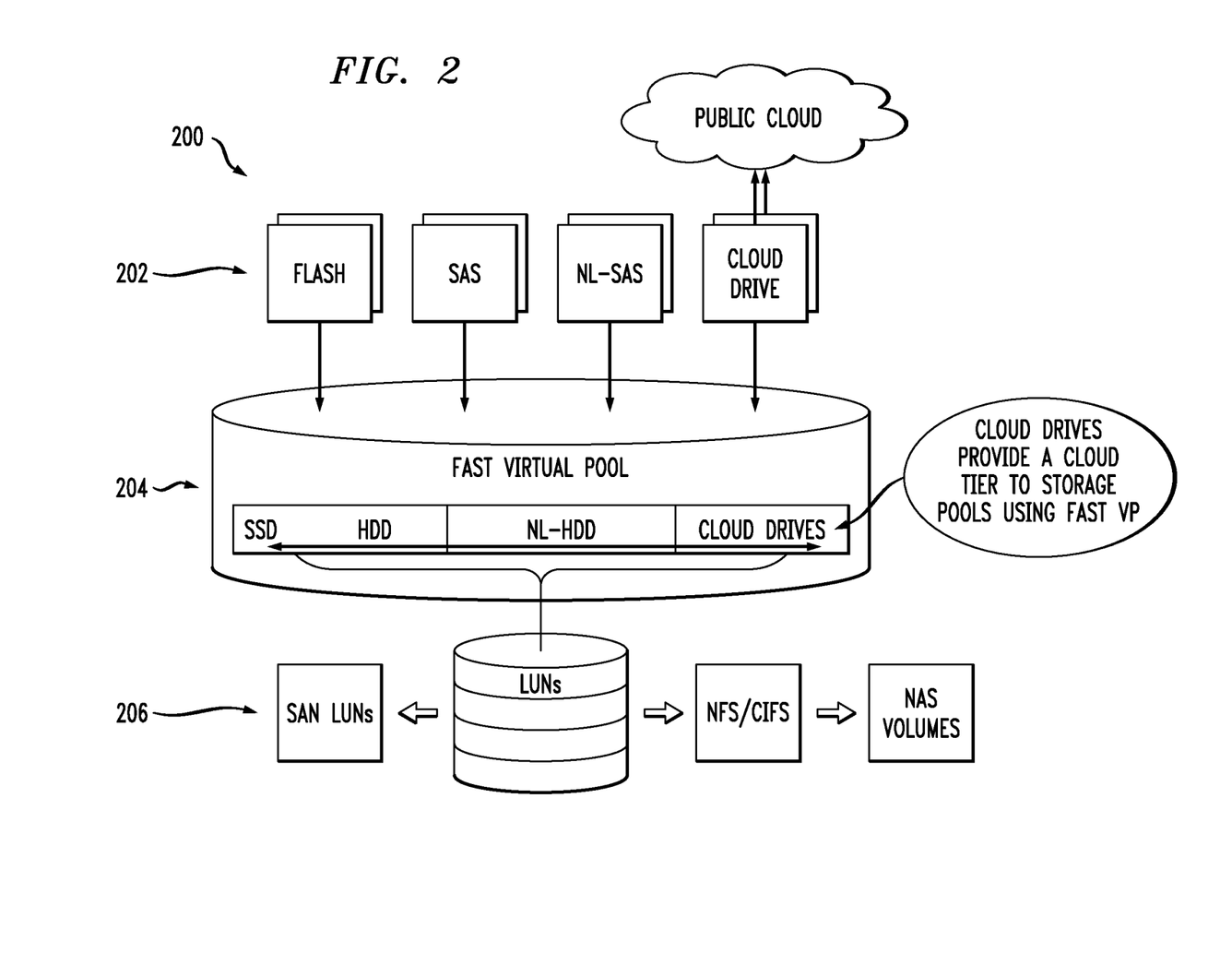
FIG. 2 is a diagram illustrating a heterogenous storage pool with a cloud drive-based storage tier according to an illustrative embodiment.

As shown in storage tiering environment 200 illustrated in FIG. 2, a set of heterogeneous drives 202 comprises Flash drives, SAS drives, NL-SAS drives, and cloud drives. The set of heterogeneous drives 202 are configured to be part of a storage pool 204 in order to be available on-demand for instantiating a set of LUNs 206 as needed in a virtual storage environment. The LUNs can be part of a storage array network (SAN) and/or part of Network Attached Storage (NAS) which is accessible via a Network File System (NFS) or a Common Internet File System (CIFS).

In this illustrative embodiment, a cloud tier provides cloud drives that can be added to storage pools configured using FAST™ Virtual Pool (VP) technology, commercially available from Dell EMC. FAST™ VP automatically optimizes performance in a tiered environment reducing costs, footprint and management effort. FAST™ VP maximizes utilization of Flash drive capacity for high input-output operations per second (IOPS) workloads and maximizes utilization of Serial Advanced Technology Attachment (SATA) or NL-SAS drives for capacity intensive applications. In accordance with illustrative embodiments, FAST™ VP is adapted to incorporate cloud drives that utilize public clouds in a cloud tier.

Since IOs on the storage array are served, for example, based on SCSI blocks from backend drives (e.g., NL-HDD or Near Line Hard Disk Drives) and the data on cloud is stored based on cloud objects, illustrative embodiments provide a native mapping application programming interface (API) that is used to map the SCSI blocks to the cloud objects. Tiering software can function as a client of the native mapping API and makes use of this API to perform archival/retrieval of data to/from the cloud storage.

Figure 3:
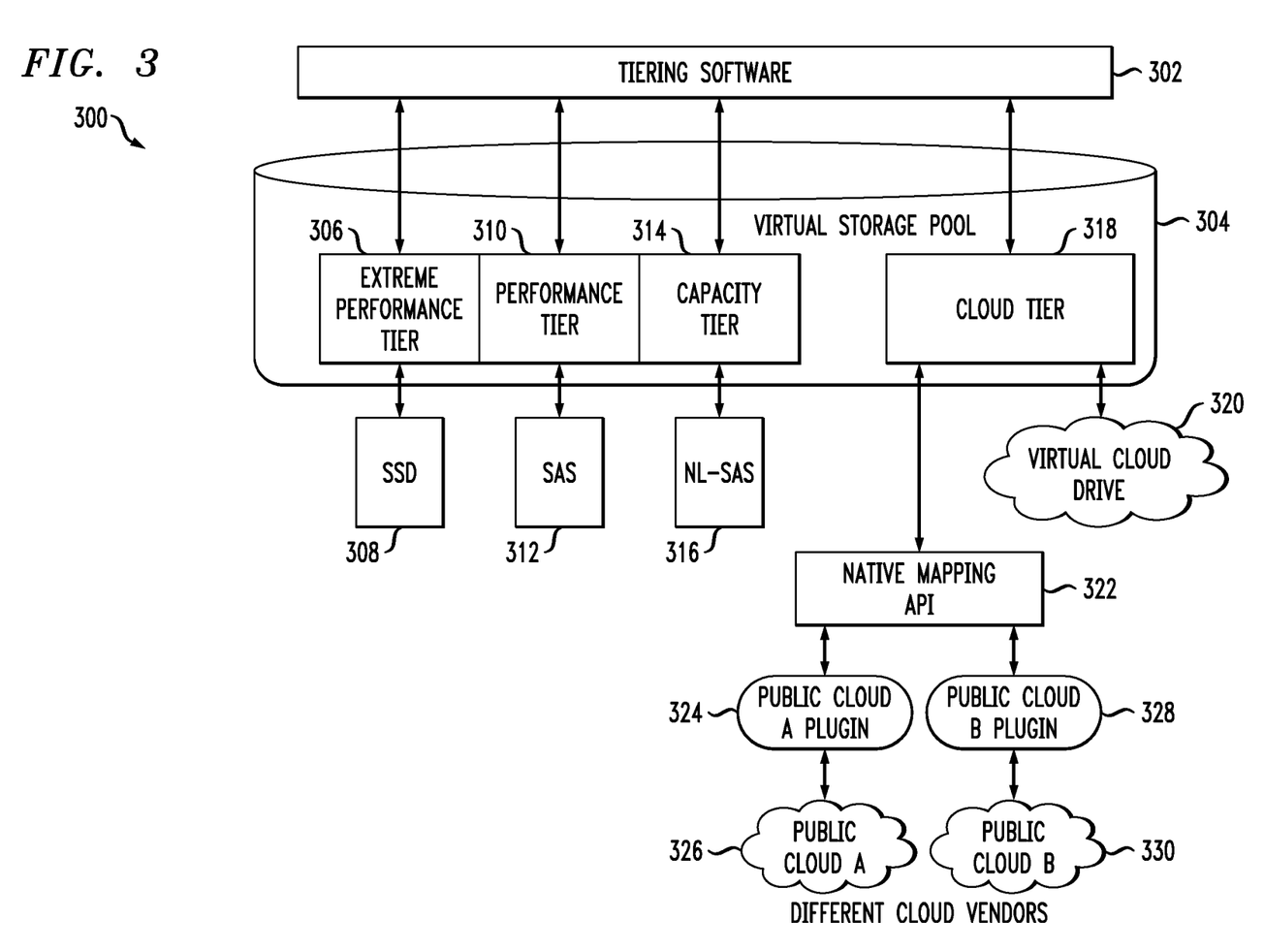
FIG. 3 is a diagram illustrating a storage tiering system of an information processing system with a cloud tier accessible using a native mapping application programming interface according to an illustrative embodiment.

FIG. 3 illustrates a storage tiering system 300 of an information processing system with a cloud tier accessible using a native mapping application programming interface according to an illustrative embodiment. It is to be appreciated that, in illustrative embodiments, an information processing system comprises a set of compute nodes that issue a plurality of data IO requests to the storage tiering system 300.

As shown, tiering software 302 controls placement of data associated with a virtual storage pool 304. One example of such tiering software may comprise FAST™ VP, although embodiments are not intended to be limited to any particular tiering software product. Virtual storage pool 304 comprises an extreme performance tier 306 which includes Flash drives 308 (for storage of the most frequently accessed data), a performance tier 310 which includes SAS drives 312 (for storage of data accessed less frequently than data in extreme performance tier 306), a capacity tier 314 which includes NL-SAS drives 316 (for storage of data accessed less frequently than data in performance tier 310 or relatively cold data), and a cloud tier 318 which includes cloud drives 320 (for storage of data accessed less frequently than data in capacity tier 314 or frigid data). Other drive types can be used, and a given tier may have a mix of drive types depending on the storage performance and capacity requirements of the information processing system.

Furthermore, in accordance with illustrative embodiments, a native mapping API 322 is provided which is an interface which acts as a driver that maps the SCSI blocks stored on tiers 306, 310 or 314 to cloud objects of the respective cloud storage provided by cloud tier 318. The API 322 also provides the abstraction to calls to plugin modules to different cloud storage vendors, e.g., plugin module 324 for public cloud 326 and plugin module 328 for public cloud 330. Examples of such public clouds may include, but are not limited to, Amazon Simple Storage Service (S3), Google Cloud Platform (GCP) Storage, and Microsoft Azure Blob Storage.

Advantageously, the API 322 is a single point of access for archival/retrieval. It is to be appreciated that the term "native" as illustratively used herein with regard to the API 322 refers to a lightweight piece of software running in a computing environment that does not necessarily need a connection external to the computing environment but rather provides access to a limited number of functions within the computing environment in which it is implemented. Thus, in this case, the API 322 is native since it provides the SCSI block-to-cloud object mapping function for the cloud tier 318 within the storage tiering system 300.

Figure 4:
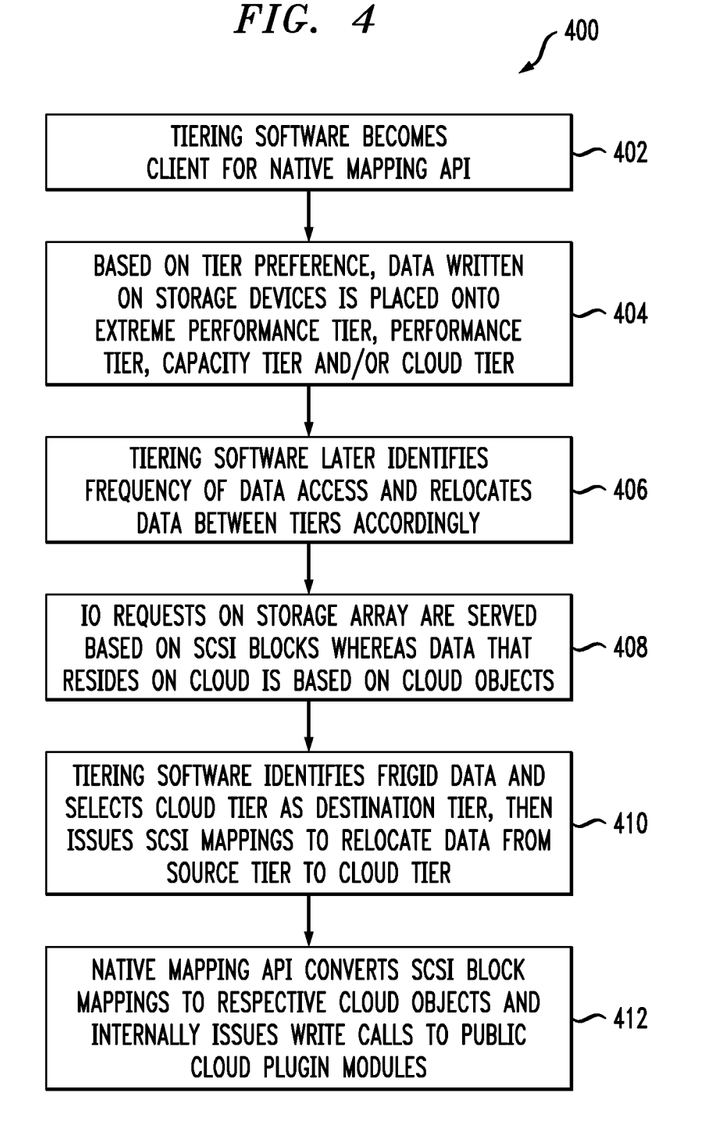
FIG. 4 is a diagram of a process for cloud storage tiering using a native mapping application programming interface according to an illustrative embodiment.

FIG. 4 illustrates a process 400 for cloud storage tiering using a native mapping application programming interface according to an illustrative embodiment. More particularly, process 400 depicts an exemplary flow of IO to cloud storage (i.e., archiving). Retrieval of data from the cloud can be performed in a straightforward manner given the native mapping API 322.

In step 402, tiering software 302 becomes the client for the native mapping API 322. In alternative embodiments, tiering control can be implemented by one or more of the tiering software, an application, and an administrator.

In step 404, based on the tier preference, data written on the storage devices is placed onto the extreme performance tier 306, the performance tier 310, the capacity tier 314 and/or the cloud tier 320.

In step 406, the tiering software 302 later identifies the frequency of data access and relocates the data between the tiers accordingly.

In step 408, the IOs (requests) on the storage array (tiers 306, 310, 314) are served based on the SCSI blocks whereas data that resides on the cloud (tier 318) is based on the cloud objects.

In step 410, when tiering software 302 identifies the frigid data and selects the cloud tier 318 as the destination tier, the tiering software 302 issues the SCSI mappings to relocate the data from the source tier (extreme performance/performance/capacity tiers) to the cloud tier 318.

In step 412, during relocation as the data is being written to the cloud tier 318, the native mapping API 322 converts these SCSI block mappings to respective cloud objects and internally issues the write calls to the respective cloud plugin modules 324 and 328 (plugins may be from different cloud vendors). These write calls later forward the cloud storage for storing the data under the cloud objects. Retrieval/reading data from the cloud objects works similar to write calls. In one illustrative embodiment, an advanced caching mechanism for caching to swiftly access the data from the cloud tier may be used.

Figure 5:
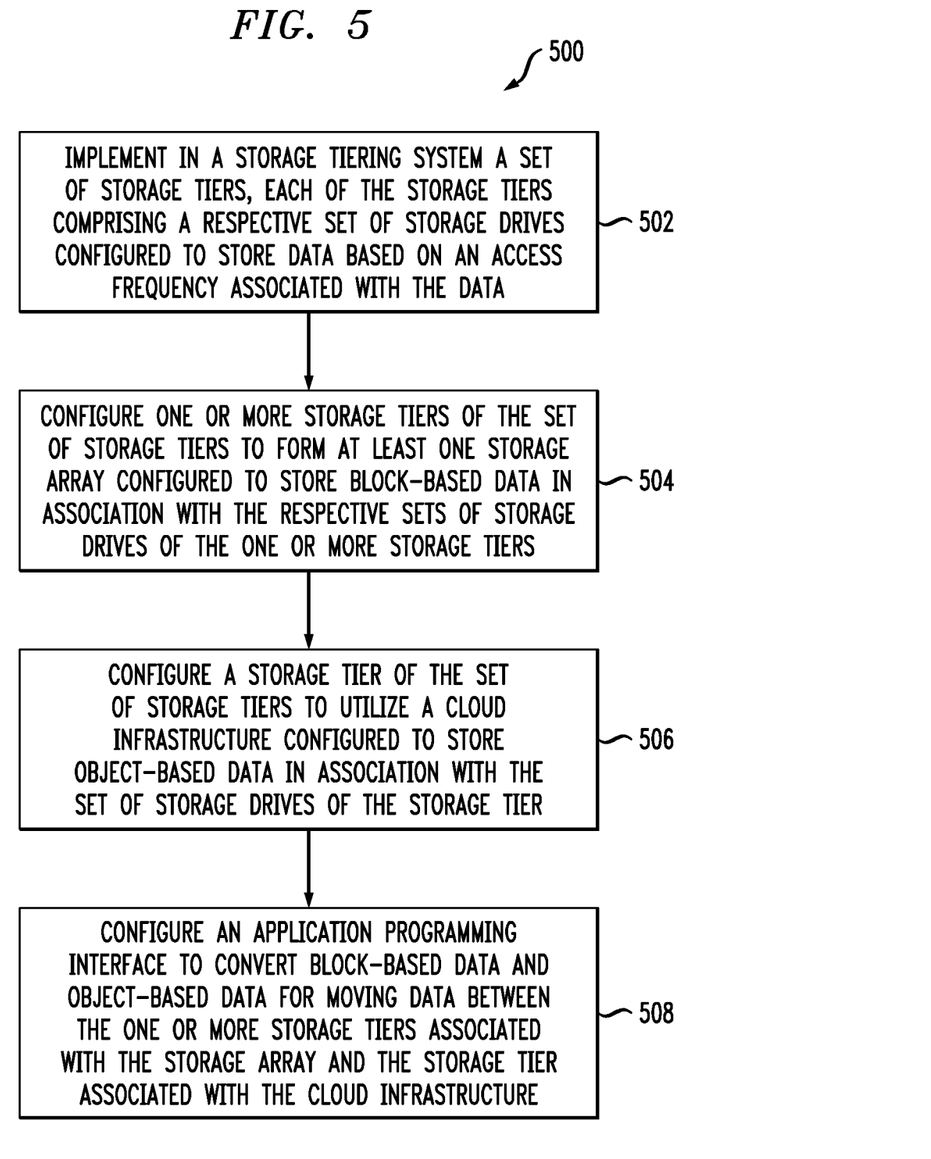
FIG. 5 illustrates a process for implementing a storage tiering system of an information processing system with a cloud tier accessible using a native mapping application programming interface according to an illustrative embodiment.

FIG. 5 illustrates a process 500 for implementing a storage tiering system of an information processing system with a cloud tier accessible using a native mapping application programming interface according to an illustrative embodiment.

Step 502 implements in a storage tiering system a set of storage tiers, each of the storage tiers comprising a respective set of storage drives configured to store data based on an access frequency associated with the data;

Step 504 configures one or more storage tiers of the set of storage tiers to form at least one storage array configured to store block-based data in association with the respective sets of storage drives of the one or more storage tiers.

Step 506 configures a storage tier of the set of storage tiers to utilize a cloud infrastructure configured to store object-based data in association with the set of storage drives of the storage tier.

Step 508 configures an application programming interface to convert block-based data and object-based data for moving data between the one or more storage tiers associated with the storage array and the storage tier associated with the cloud infrastructure.

Figure 6:
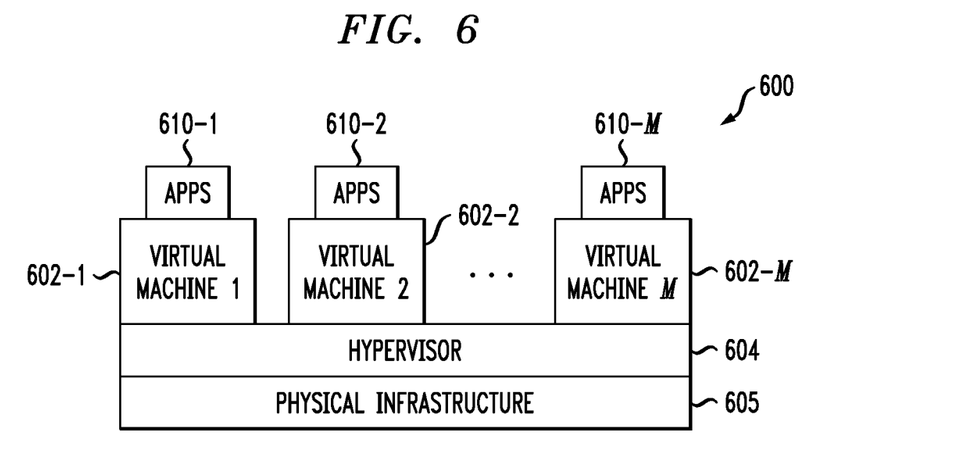
FIGS. 6 and 7 show examples of processing platforms utilized to implement an information processing system according to embodiments of the invention.

It is to be appreciated that the various components and steps illustrated and described in FIGS. 1 through 5 can be implemented in a distributed virtual infrastructure or cloud infrastructure. FIG. 6 illustrates a cloud infrastructure 600. The storage tiering system environment 300 of FIG. 3 (storage tiering system environment 200 of FIG. 2) can be implemented, in whole or in part, by the cloud infrastructure 600.

As shown, the cloud infrastructure 600 comprises virtual machines (VMs) 602-1, 602-2, . . . , 602-M implemented using a hypervisor 604. The hypervisor 604 runs on physical infrastructure 605. The cloud infrastructure 600 further comprises sets of applications 610-1, 610-2, . . . , 610-M running on respective ones of the virtual machines 602-1, 602-2, . . . , 602-M (utilizing associated logical storage units or LUNs) under the control of the hypervisor 604. The virtual machines 602-1, 602-2, . . . , 602-M are one illustrative embodiment of a set of compute nodes (e.g., implemented on one or more host devices) that issue IO requests to the LUNs that are part of a storage tiering system (e.g., 200 in FIG. 2, 300 in FIG. 3).

As used herein, the term "cloud" refers to a collective computing infrastructure that implements a cloud computing paradigm. For example, as per the National Institute of Standards and Technology (NIST Special Publication No.

800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although only a single hypervisor 604 is shown in the example of FIG. 6, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 604 which, as shown in FIG. 6, is directly inserted on top of the computer hardware in order to allocate hardware resources of the physical computer (physical infrastructure 605) dynamically and transparently. The hypervisor 604 affords the ability for multiple operating systems to run concurrently on a single physical computer and share hardware resources with each other.

An example of a commercially available hypervisor platform that may be used to implement portions of the cloud infrastructure 600 in one or more embodiments of the invention is vSphere® which may have an associated virtual infrastructure management system such as vCenter®, both commercially available from VMware Inc. (Palo Alto, Calif.). The underlying physical infrastructure 605 may comprise one or more distributed processing platforms that include storage products such as VNX® and Symmetrix VMAX®, both commercially available from Dell EMC. A variety of other storage products may be utilized to implement at least a portion of the cloud infrastructure 600.

Figure 7:
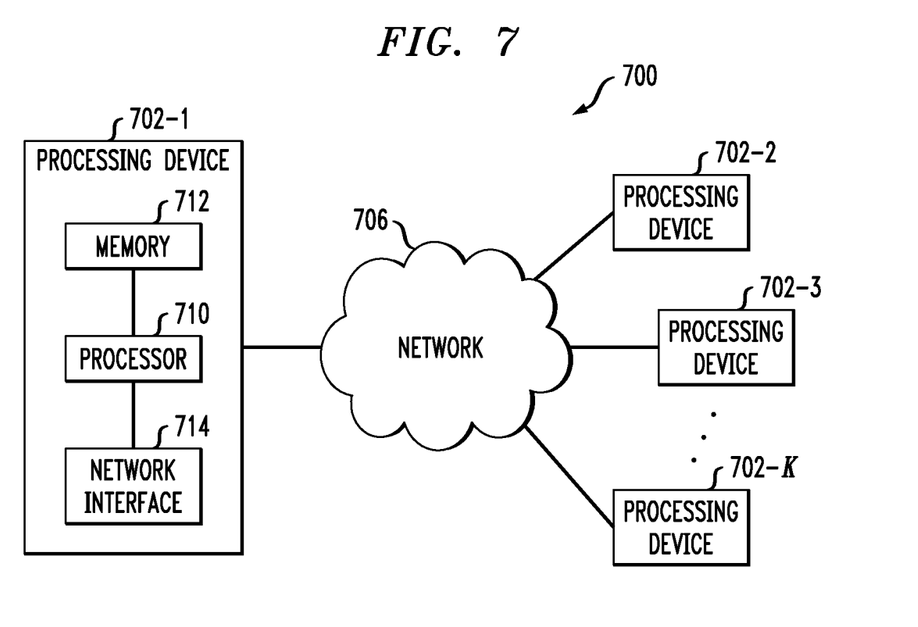

An example of a processing platform on which the cloud infrastructure 600 may be implemented is processing platform 700 shown in FIG. 7. The processing platform 700 in this embodiment comprises a plurality of processing devices denoted 702-1, 702-2, 702-3, . . . , 702-K which communicate with one another over a network 706. One or more of the components shown and described in FIGS. 1 through 5 may therefore each run on one or more storage arrays, one or more hosts, servers, computers or other processing platform elements, each of which may be viewed as an example of what is more generally referred to herein as a "processing device." As illustrated in FIG. 7, such a device generally comprises at least one processor and an associated memory, and implements one or more functional modules for controlling certain features of components shown in FIGS. 1 through 5. Again, multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements.

The memory 712 (or other storage devices) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 712 may comprise electronic memory such as random access memory (RAM), read-only memory (ROM) or other types of memory, in any combination. One or more software programs (program code) when executed by a processing device such as the processing device 702-1 causes the device to perform functions associated with one or more of the elements/components of storage tiering environments described herein. One skilled in the art would be readily able to implement such software given the teachings provided herein. Other examples of processor-readable storage media embodying embodiments of the invention may include, for example, optical or magnetic disks.

Also included in the processing device 702-1 is network interface circuitry 714, which is used to interface the processing device with the network 706 and other system components. Such circuitry may comprise conventional transceivers of a type well known in the art.

The other processing devices 702 of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, logical units, etc. Again, the particular processing platform shown in FIG. 7 is presented by way of example only, and components and steps shown and described in FIGS. 1 through 5 may include additional or alternative processing platforms, as well as numerous distinct processing platforms in any combination.

Also, numerous other arrangements of servers, computers, storage devices or other components are possible for implementing components shown and described in FIGS. 1 through 5. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, storage tiering systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage tiering system comprising a set of storage tiers, each of the storage tiers comprising a respective set of storage drives configured to store data based on an access frequency associated with the data;
the set of storage tiers comprising one or more storage tiers forming at least one storage array configured to store block-based data in association with the respective sets of storage drives of the one or more storage tiers;
the set of storage tiers comprising a cloud storage tier utilizing a cloud infrastructure configured to store object-based data in association with the set of storage drives of the cloud storage tier, the set of storage drives of the cloud storage tier comprising virtual cloud drives that are configured to store references to storage capacity of the cloud infrastructure, the cloud infrastructure being located remotely from the apparatus;
an application programming interface configured to convert between block-based data and object-based data for moving data between storage on the one or more storage tiers of the at least one storage array and storage on the cloud storage tier associated with the cloud infrastructure; and
tiering software configured to utilize the application programming interface to at least one of archive and retrieve data stored on the cloud infrastructure, the tiering software configured:
to determine that a portion of the object-based data stored on the cloud storage tier has an access frequency above a predetermined threshold; and
responsive to determining that the portion of the object-based data stored on the cloud storage tier has an access frequency above the predetermined threshold:
to utilize the application programming interface to convert the portion of the object-based data to a portion of block-based data; and
to store the converted portion of block-based data on the one or more storage tiers of the at least one storage array that are configured to store block-based data.

2. The apparatus of claim 1, wherein the storage drives from the set of storage tiers form a heterogeneous storage pool.

3. The apparatus of claim 1, wherein the one or more storage tiers of the storage array comprise a first storage performance tier, a second storage performance tier, and a storage capacity tier.

4. The apparatus of claim 3, wherein the set of storage drives associated with the first storage performance tier comprises one or more Flash drives.

5. The apparatus of claim 3, wherein the set of storage drives associated with the second storage performance tier comprises one or more SAS drives.

6. The apparatus of claim 3, wherein the set of storage drives associated with the storage capacity tier comprises one or more NL-SAS drives.

7. The apparatus of claim 1, wherein the cloud infrastructure comprises one or more third-party cloud providers.

8. The apparatus of claim 7, wherein the one or more third-party cloud providers comprise one or more of a private cloud provider, a public cloud provider, and a hybrid cloud provider.

9. The apparatus of claim 1, wherein the application programming interface is further configured to provide at least one of write calls to write data to the storage capacity of the cloud infrastructure and read calls to read data from the storage capacity of the cloud infrastructure to one or more plugin modules associated with the cloud infrastructure.

10. The apparatus of claim 1, wherein the data stored in the cloud infrastructure in association with the cloud storage tier comprises the least frequently accessed data in the storage tiering system.

11. A method, comprising:
implementing in a storage tiering system a set of storage tiers, each of the storage tiers comprising a respective set of storage drives configured to store data based on an access frequency associated with the data;
configuring one or more storage tiers of the set of storage tiers to form at least one storage array configured to store block-based data in association with the respective sets of storage drives of the one or more storage tiers;
configuring a cloud storage tier of the set of storage tiers to utilize a cloud infrastructure configured to store object-based data in association with the set of storage drives of the cloud storage tier, the set of storage drives of the cloud storage tier comprising virtual cloud drives that are configured to store references to storage capacity of the cloud infrastructure, the cloud infrastructure being located remotely from the apparatus; and
configuring an application programming interface to convert between block-based data and object-based data for moving data between storage on the one or more storage tiers of the at least one storage array and storage on the cloud storage tier associated with the cloud infrastructure;
configuring tiering software to utilize the application programming interface to at least one of archive and retrieve data stored on the cloud infrastructure;
determining, by the tiering software, that a portion of the object-based data stored on the cloud storage tier has an access frequency above a predetermined threshold; and
responsive to determining that the portion of the object-based data stored on the cloud storage tier has an access frequency above the predetermined threshold:
utilizing the application programming interface to convert the portion of the object-based data to a portion of block-based data; and
storing the converted portion of block-based data on the one or more storage tiers of the at least one storage array that are configured to store block-based data;
wherein the method is performed by a processing platform comprising a plurality of processing devices.

12. The method of claim 11, wherein the application programming interface is further configured to provide at least one of write calls to write data to the storage capacity of the cloud infrastructure and read calls to read data from the storage capacity of the cloud infrastructure to one or more plugin modules associated with the cloud infrastructure.

13. The method of claim 11, wherein the data stored in the cloud storage tier of the cloud infrastructure comprises the least frequently accessed data in the storage tiering system.

14. The method of claim 11, wherein the cloud infrastructure comprises one or more third-party cloud providers.

15. The method of claim 14, wherein the one or more third-party cloud providers comprise one or more of a private cloud provider, a public cloud provider, and a hybrid cloud provider.

16. An information processing system, comprising:
a set of compute nodes that issue a plurality of data input-output requests;
a storage tiering system operatively coupled to the set of compute nodes, the storage tiering system comprising a set of storage tiers, each of the storage tiers comprising a respective set of storage drives configured to store data based on an access frequency associated with the data;
the set of storage tiers comprising one or more storage tiers forming at least one storage array configured to store block-based data in association with the respective sets of storage drives of the one or more storage tiers;
the set of storage tiers comprising a cloud storage tier utilizing a cloud infrastructure configured to store object-based data in association with the set of storage drives of the cloud storage tier, the set of storage drives of the cloud storage tier comprising virtual cloud drives that are configured to store references to storage capacity of the cloud infrastructure, the cloud infrastructure being located remotely from the apparatus;
an application programming interface configured to convert between block-based data and object-based data for moving data between storage on the one or more storage tiers of the at least one storage array and storage on the cloud storage tier associated with the cloud infrastructure; and
tiering software configured to utilize the application programming interface to at least one of archive and retrieve data stored on the cloud infrastructure, the tiering software configured:
to determine that a portion of the object-based data stored on the cloud storage tier has an access frequency above a predetermined threshold; and
responsive to determining that the portion of the object-based data stored on the cloud storage tier has an access frequency above the predetermined threshold:
to utilize the application programming interface to convert the portion of the object-based data to a portion of block-based data; and
to store the converted portion of block-based data on the one or more storage tiers of the at least one storage array that are configured to store block-based data.

17. The information processing system of claim 16, wherein the cloud infrastructure comprises one or more third-party cloud providers.

18. The information processing system of claim 17, wherein the one or more third-party cloud providers comprise one or more of a private cloud provider, a public cloud provider, and a hybrid cloud provider.

19. The information processing system of claim 16, wherein the data stored in the cloud infrastructure in association with the cloud storage tier comprises the least frequently accessed data in the storage tiering system.

20. The apparatus of claim 1, wherein the tiering software is further configured:
to determine that a second portion of block-based data stored on the one or more storage tiers of the at least one storage array that are configured to store block-based data has an access frequency below a second predetermined threshold; and
responsive to determining that the second portion of the block-based data has an access frequency below the second predetermined threshold:
to utilize the application programming interface to convert the second portion of the block-based data to a second portion of object-based data; and
to store the converted second portion of object-based data on the cloud storage tier.

* * * * *